No. 620,779. Patented Mar. 7, 1899.
W. HOWARD.
PNEUMATIC TIRE.
(Application filed June 18, 1898.)

(No Model.)

Witnesses:
John Chalmers Whalen
Percy C. Bowen

Inventor:
William Howard,
by Whitman & Fisher,
Attorneys.

THE NORRIS PETERS CO., PHOTO-LITHO., WASHINGTON, D. C.

UNITED STATES PATENT OFFICE.

WILLIAM HOWARD, OF LONDON, ENGLAND.

PNEUMATIC TIRE.

SPECIFICATION forming part of Letters Patent No. 620,779, dated March 7, 1899.

Application filed June 18, 1898. Serial No. 683,826. (No model.)

*To all whom it may concern:*

Be it known that I, WILLIAM HOWARD, a subject of the Queen of Great Britain and Ireland, residing at 13 Theobalds road, London, England, have invented Improvements in Pneumatic Tires, (for which I have applied for a patent in Great Britain, No. 27,517, bearing date November 23, 1897,) of which the following is a specification.

This invention relates to pneumatic tires for motor-carriages and heavy vehicles, and has for its chief object means for securing the tire to the rim of the wheel. It is applicable both to wheels made in two sections and to ordinary wheel-rims.

I will now proceed to describe my invention with reference to the drawings accompanying this specification, in which—

Figure 1:
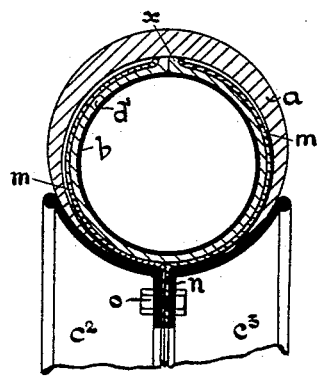
Figure 3:
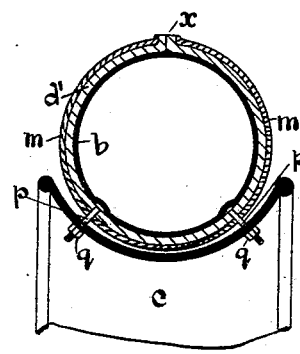
Figure 2:
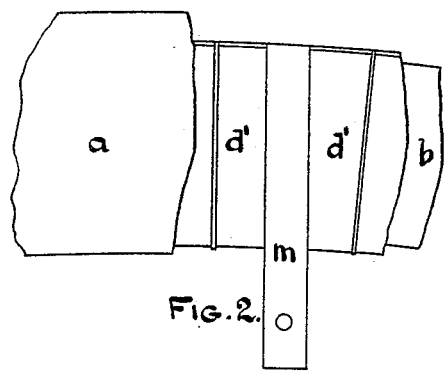
Figure 4:
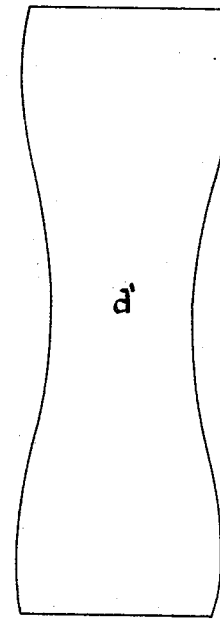

Figure 1 shows a section of tire and rim made in two sections. Fig. 2 is an elevation of a small portion of said tire. Fig. 3 shows a section of a modification of said tire applied to an ordinary rim. Fig. 4 is a detail hereinafter referred to.

The same letters of reference are employed to denote the same parts in all the views.

$a$ shows the outer covering, $b$ the air-chamber, and $c$ the rim. The air-tube $b$ is surrounded and protected by a leather cover $d'$. This cover is formed of a number of strips of the shape shown at Fig. 4. The edges of these strips are turned slightly outward, as shown at $x$, Figs. 1 and 3, so that the stitching, which is through these edges, shall not form ridges upon the inner surface of the cover $d'$. This inner surface is consequently left perfectly smooth. The main seam of this cover $d'$ is at the top or outer side, as shown at $x$, Figs. 1 and 3. $m$ shows strips of leather forming tongues (placed at suitable intervals around the tire) attached to the leather cover $d'$ at the top $x$ and passing around the said cover until they meet at the bottom or inside $n$, Fig. 1, where they are clamped between two sections $c^2$ and $c^3$ of a wheel made in two parts, as shown at Fig. 1. $o$ shows one of the bolts employed for holding these two sections together. This leather cover $d'$ is enveloped in an outer rubber cover $a$, which may be of the usual form. The ends of the strips $m$ pass between the edges of the outer cover.

In the modification shown at Fig. 3, in which view for the sake of clearness the outer cover is not shown, the wheel $c$ is of the ordinary form, (not in two sections,) and the attachment is effected by means of screws $p$, passing through the leather cover $d'$, strips $m$, cover $a$, and rim $c$ of the wheel, nuts $q$ being screwed down on the projecting ends of the screws $p$.

What I claim as my invention, and desire to secure by Letters Patent, is—

1. A pneumatic tire, composed of an inner air-tube, a leather tube forming a cover for said air-tube, and composed of a number of strips secured together with the edges of the strips turned outward, leather strips forming securing-tongues secured to said leather tube, and an outer tube of rubber, substantially as described.

2. The combination of a wheel-rim divided into two parts, bolts for securing the parts together, and a pneumatic tire composed of an air-tube, a leather tube formed of strips secured together and surrounding said air-tube, leather tongues secured to said leather tube, and an outer tube of rubber, said tongues being adapted to be secured between the two parts of the wheel-rim when said parts are clamped together, substantially as described.

WILLIAM HOWARD.

Witnesses:
 WALTER EVERETT,
 ALY BROWNE.